May 22, 1962 W. H. PETERSON 3,035,714
LONG TRAVEL HYDRAULIC CUSHION DEVICE
Filed Feb. 19, 1960 3 Sheets-Sheet 1

INVENTOR.
William H. Peterson
By Mann, Brown & McWilliams
Attys.

United States Patent Office 3,035,714
Patented May 22, 1962

3,035,714
LONG TRAVEL HYDRAULIC CUSHION DEVICE
William H. Peterson, Homewood, Ill., assignor to Pullman Incorporated, Chicago, Ill., a corporation of Delaware
Filed Feb. 19, 1960, Ser. No. 9,785
6 Claims. (Cl. 213—43)

My invention relates to a long travel hydraulic cushion device of the type described in my copending application Serial No. 782,786, filed December 24, 1958, the disclosure of which is hereby incorporated herein in its entirety.

The device of said copending application provides a shock dissipating travel on the order of 30 inches to adapt it to provide, in the railroad field, as when applied to cushion underframe cars and the like, the benefits described in my copending application Serial No. 856,963, filed December 3, 1959, now Patent No. 3,003,436, granted October 10, 1961, the disclosure of which is also hereby incorporated herein in its entirety by this reference.

The present application relates to improvements in the device described in said copending application Serial No. 782,786.

Hydraulic cushioning devices have heretofore been considered impractical for use in railroad cars, to absorb longitudinal impacts, because of oil leakage and excessive manufacturing costs and maintenance. I have determined that much of the oil leakage can be laid to the sliding or dynamic seals that are employed and the exposure of such seals to excessively high hydraulic liquid pressures. Furthermore, sliding or dynamic oil seals, by their very nature, require close manufacturing tolerances to be operative, and the machining thus made necessary forms a substantial part of the overall manufacturing cost. And, of course, the excessive oil leakage requires too frequent inspection and servicing to keep maintenance costs at economical levels.

One of the principal advantages of the invention described in said copending application Serial No. 856,963 is that long travel cushioning action contemplated by that invention insures that hydraulic operating pressures are reduced to practical operating ranges, which in addition to making hydraulics available for absorbing impacts in the railroad field, also tends to negate some of the disadvantages of sliding or dynamic seals. However, it has become apparent to me that sliding or dynamic seals must be eliminated from hydraulic cushioning devices to avoid the leakage problem, that the cushioning components must admit of more simplified minimal manufacturing steps to make hydraulic cushions attractive to the railroad industry, and that the device as a whole must be devised to make infrequent inspection and servicing the rule rather than the exception.

A principal object of this invention is to provide a simplified low cost long travel hydraulic cushion device in which sliding seals are eliminated.

Further principal objects of my invention are to provide a hydraulic cushion device which is arranged to space high pressure liquids from parts of the device where leakage problems are most acute, which is arranged to effect maximum dissipation of heat that is generated when impacts are absorbed, and which substantially eliminates the need for expensive machining operations during manufacture of the device.

Other objects of the invention are to provide a hydraulic cushion device which may be applied to existing equipment with minimum alterations, and which is of general application and thus is adapted for use in any field where long travel cushioning is desired.

Other objects, uses and advantages will be obvious or become apparent from a consideration of the following detailed description and the application drawings.

Figures 1, 2, 3:
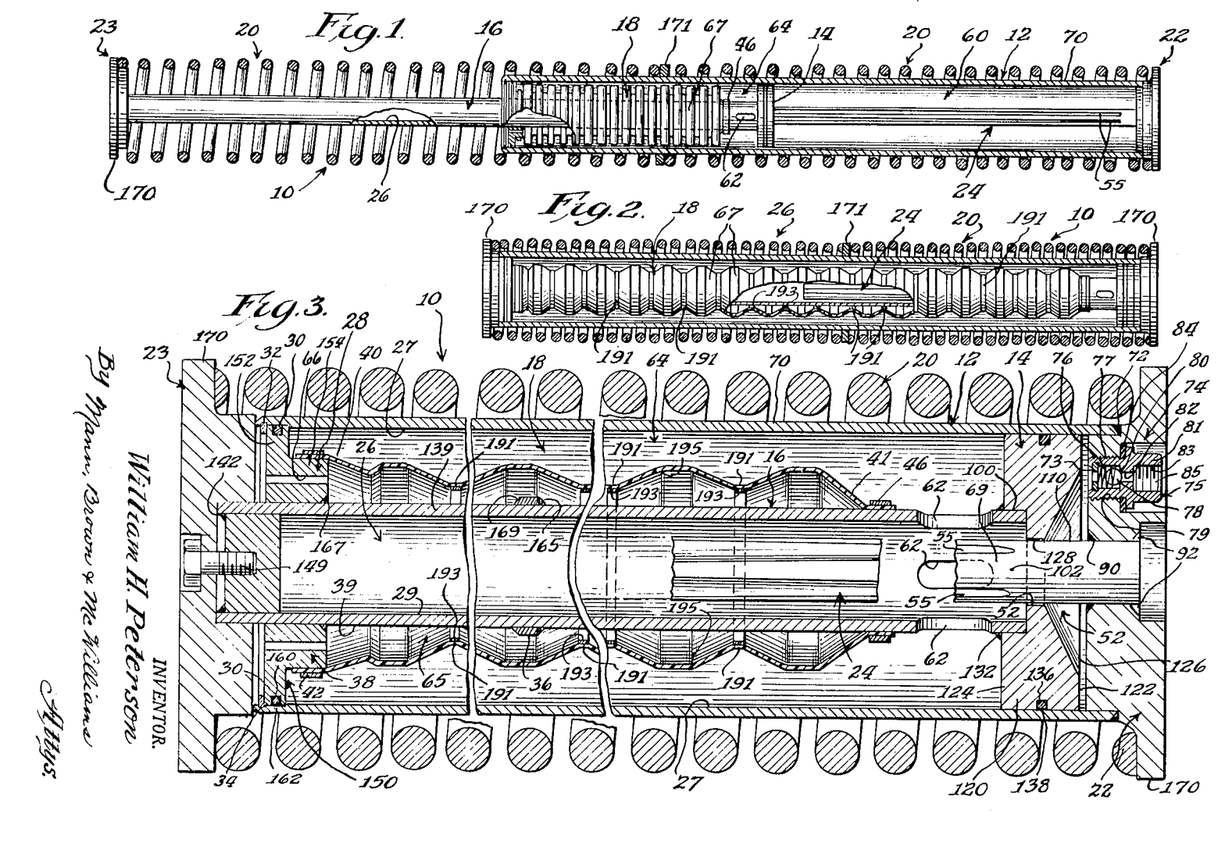
FIGURE 1 is a small scale diagrammatic plan view of the improved embodiment of the invention, shown in its fully extended position, parts being broken away to facilitate illustration.
FIGURE 2 is similar to that of FIGURE 1 but showing the device in its fully retracted position.
FIGURE 3 is a showing of the cushion device as positioned in FIGURE 2, but on an enlarged scale, with parts broken away.

Reference numeral 10 of FIGURES 1 and 2 generally indicates a specific embodiment of the improved cushion device, which generally comprises a tubular cylinder 12 in which a piston head 14 is reciprocably mounted, a tubular piston rod 16 fixed to the piston head 14, a flexible tubular sealing member or boot 18 connected between the tubular cylinder 12 and the tubular piston rod 16, and helical compression springs 20 extending in tandem between closure members 22 and 23 of tubular cylinder 12 and tubular piston rod 16, respectively.

The closure member 22 of tubular cylinder 12 forms a cylinder head and carries metering pin 24 that is reciprocably received within the bore 26 of the tubular piston rod 16.

The internal surface 27 of tubular cylinder 12 is counterbored as at 30 (see FIGURE 4) to receive a piston rod guide or tubular cylinder head member 38 that is held in place by a snap ring 32 received in an annular groove 34 formed in the end of the tubular cylinder 12.

Figure 4:
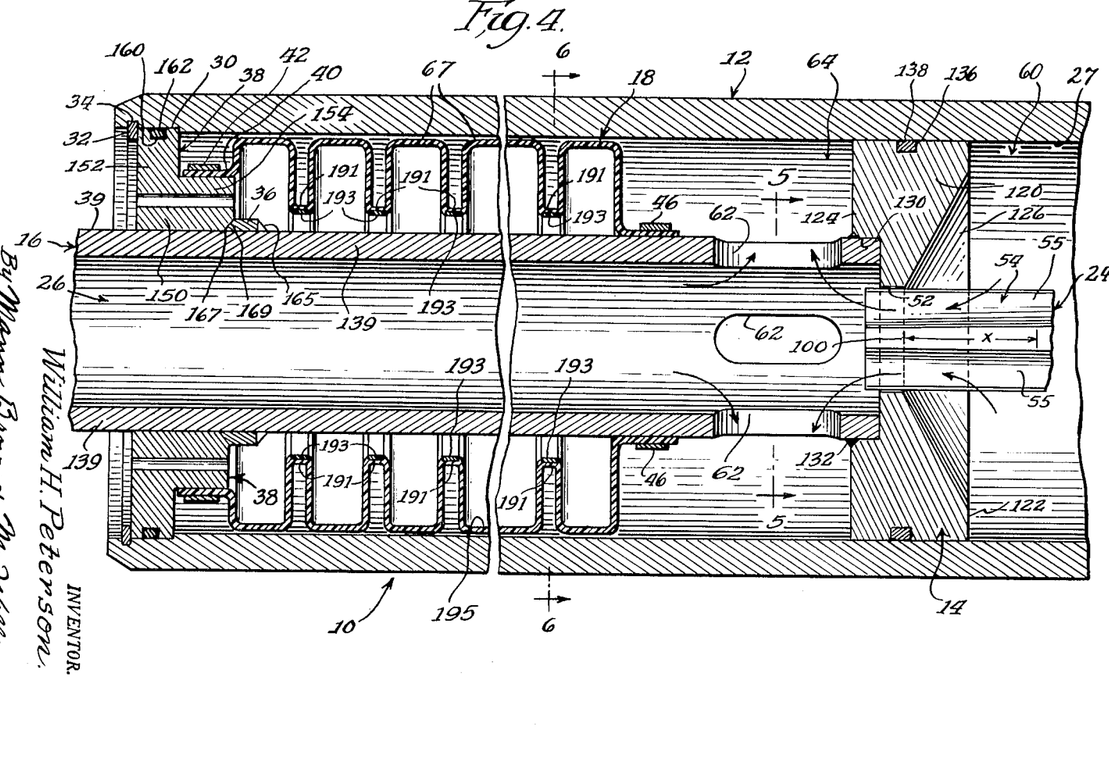
FIGURE 4 is a fragmental cross-sectional view of the cushion device as positioned in FIGURE 1, but on an enlarged scale.

The snap ring 32 serves ultimately as a stop for the piston head 14 when the device is in its extended position of FIGURES 1 and 4, and in the illustrated embodiment, this is achieved by applying an annular ring 36 to the outer surface 39 of the tubular piston rod. As shown in FIGURE 4, ring 36 engages against piston rod guide 38 in the extended position of the device.

As is best shown in FIGURES 3 and 4, one end 40 of the tubular seal 18 is secured to the piston rod guide member 38 by a suitable clamp 42 while the other end 41 of the seal 18 is secured to the external surface 39 of the piston rod by a suitable clamp 46.

The device 10 is charged with hydraulic liquid to completely fill the space defined by the tubular cylinder 12, the tubular piston rod 16 and the tubular seal or boot 18.

When the device is in use, as when employed as a cushion unit for a cushion underframe of a railroad car, the normal positioning of the device components is that shown in FIGURES 1 and 4, the device being mounted between suitable abutments (not shown) as is customary in this art. When the cushion underframe receives a shock either in buff or draft, either the tubular cylinder 12 will commence movement to the left of FIGURE 1, or the tubular piston rod 16 and piston head 14 will commence movement to the right of FIGURE 1, or possibly both movements may occur. In any event, as the device 10 retracts under the force being cushioned, the metering pin 24 displaces hydraulic liquid contained within the tubular piston rod 16 and the piston head 14 causes the hydraulic liquid flow through its orifice 52 through which the metering pin 24 extends.

In the illustrated improvement, the metering pin is provided with a plurality of spaced tapered grooves 54, which in the form illustrated are defined by concave surfaces 55, which are inclined or tapered with respect to the longitudinal axis of the metering pin to provide a substantially constant force travel characteristic as the cushion contracts under the shock imposed upon it; that is, the arrangement is such that for every unit of travel, the cushion device provides a substantially constant cushioning effect.

As best shown in FIGURE 4, the oil flow initiated by application of the longitudinal shock is from chamber 60 on the high pressure side of piston 14 through orifice 52 and then into the bore 26 of tubular piston rod 16, thence radially outwardly of the piston rod 16 through orifices or ports 62 of the tubular piston rod. As the hydraulic liquid within the tubular piston rod is displaced by the metering pin 24, it likewise moves through ports 62, as indicated by the arrows.

The hydraulic liquid flow through ports 62 is under relatively high velocity and creates great turbulence in the chamber 64 that is forced by the space between tubular piston guide member 38 and piston head 14, as limited by tubular seal 18. This great turbulence is caused at least in part by the radially directed flow of hydraulic liquid impinging directly against the inner surface 27 of tubular cylinder 12, and is responsible for dissipation of much of the kinetic energy of the impact in the form of heat.

As the contraction of the cushion device 19 proceeds, the high pressure chamber 60 is reduced in volume by the advancement of the piston head 14 toward the tubular cylinder closure member 22. The hydraulic liquid passing through orifice 52 fills the chamber 64 behind the piston head 14, while a volume of hydraulic liquid equivalent to that displaced by the total entry into the fluid chamber of the piston rod 16 displaces the flexible seal toward the external surface 39 of the tubular piston rod, against the pressure of the ambient air. As the seal deflects toward the external surface of the tubular piston rod, air within the chamber 65 defined by the tubular piston rod, the tubular seal 18, and the piston rod guide 38, passes outwardly of the device through apertures 66 of the guide member 38. The apertures 66 are made relatively large in cross-sectional area to insure a free flow of air outwardly and inwardly of the space 65.

As the device 10 closes in dissipating shock, a small proportion of the energy of the shock is stored as potential energy in the compression springs 20. After the impetus of the shock has been dissipated, springs 20, acting in tandem, return the hydraulic cushion components to the initial extending position of FIGURES 1 and 8, this action expending the portion of the energy occasioned by the impact that is stored in the return springs. During this extension movement under the action of the compression springs, the oil flow illustrated in FIGURE 4 is reversed, and the tubular seal or boot 18 contracts to the position of FIGURE 1, thereby insuring that the hydraulic liquid displaced by the piston rod 16 and metering pin 24 is restored to its normal operative locations.

In the improvement illustrated, the seal 18 is in the form of a molded tubular element having accordion type pleats 67. The metering pin in the device disclosed in said application Serial No. 782,786 is eliminated in favor of the fluted metering pin 24 to eliminate operational difficulties caused by metering pin vibration.

Studies have shown that vibration of the tapered form of metering pin has been caused primarily by slight misalignments of the pin with regard to the axial center of the piston head orifice 52. During closure of a cushion device employing a tapering metering pin (which conventional manufacturing tolerances make difficult to precisely center with regard to a piston head orifice 52), oil flow between the pin and the portion of the piston head defining the orifice 52 deflects the metering pin if it is the slightest bit off center with regard to the orifice. Under severe impacts, the vibration becomes excessive as it builds up in a manner similar to the cumulative effect of a group of soldiers marching on a bridge and tends to enlarge the orifice 52 by engagement of the vibrating metering pin with the piston head. While the metering pin guide employed in the arrangement of application Serial No. 782,786 reduces this vibrating problem, it becomes less and less effective as it moves away from the piston head during closure on impacts.

To solve the vibration problem, the metering pin 24 in the illustrated embodiment is provided with cylindrical surface 69 in which the concave surfaces 55 are formed to define the tapered metering grooves 54. The surfaces 55 are spaced apart to define ridges 71 that engage the piston head surface 128 which defines the orifice 52 through which the metering pin extends.

Thus, the movement of the metering pin with respect to the piston head is guided throughout the contraction stroke of the device by the surface which defines the orifice through which the metering pin extends and the pin is thus confined or held at the point where it is being excited. This effects complete elimination of vibration of the metering pin with respect to the piston head.

It will thus be seen that a simple reliable long travel cushioning device is provided composed of few and simple components. Furthermore, all kinetic energy applied to the cushion device is transferred and/or dissipated in the form of heat (depending on the use to which the device is put) by the passing of the hydraulic liquids through orifice 52 and the turbulence in chamber 64, with the exception of the small potential energy stored in the return springs.

*Specific Description*

The tubular member 12 may be formed from any suitable material such as cold drawn seamless A.I.S.I. 1015–1018 or 1020–1025 (about 1022 is preferred) steel tubing having a minimum yield point of 70,000 p.s.i., the counterbore 30 and recess 34 being formed in any suitable manner, such as by lathe cutting in the internal surface 27. Internal surface 27 between counterbore 30 and closure 22 need only be sufficiently smooth to permit efficient operation of piston head 14, and the smoothness may be, and preferably is, comparable with (i.e. substantially equivalent to) that ordinarily obtained by drawing tubing over a polished mandrel. In the embodiment illustrated, the tubular member 12 comprises tube 70 welded as at 72 to closure plate or member 22, the latter forming the base plate or follower of tubular cylinder 12. The closure plate or member 22 is provided with an improved check valve assembly generally indicated at 74 (see FIGURE 3) through which the hydraulic liquid passes when the device 10 is charged.

The check valve assembly 74 illustrated includes a tubular body 75, threaded as at 77, for turning into an appropriate threaded opening 79 formed in closure plate or member 22. Body 75 includes a hex-shaped head 81 formed to receive a suitable turning tool, and a threaded recess 83 for receiving a suitable closure screw 85. Mounted within the body 75 is a compression spring 76 acting between annular spring disc 73 and ball 78 to press ball 78 against valve seat 80 about inlet passage 82. Disc 73 is fixed to body 75 in any suitable manner.

Body 75 may be turned against annular seal 84 to insure that an adequate sealing action is provided.

The spacing of snap ring 32, and thus its recess 34 formed in tube 70, and the annular abutment forming ring 36 of the tubular piston rod must be such that the piston rod ports 62 remain uncovered at all times. Also, the spacing is preferably such that the distance between the piston rod guide 38 and the piston head 14, in the extended position of the device, is on the order of ¼ of the length of the device, which overcomes any tendency of the device to jackknife on application of impact forces to either end thereof.

The metering pin 24 is preferably formed from La Salle stressproof steel (which is a specially treated 1144 A.I.S.I. steel containing beryllium-copper, antimony and lead) and is preferably applied to closure plate or member 22 as by being welded thereto where indicated at 90 and 92 (as this eliminates leakage problems since the welded joints provide and insure the necessary sealing action); however, it may be threaded for removable connection to plate or member 22 where removability is desired, and, of course, suitable supplemental seals would then have to be provided.

The surfaces 55 of the metering pin should have between points 100 and 102 (see FIGURES 3 and 4) along the length of the metering pin the taper necessary to give the device 10 a constant force travel characteristic on closure. The taper of the surfaces 55 in the illustrated embodiment may be obtained from the relationship $$A_X = A_o \sqrt{1 - \frac{x}{d}}$$

wherein $A_x$ is the orifice area of any position $x$ (see FIGURE 4) over the total nominal stroke $d$ (the length between points 100 and 102) and $A_o$ is the initial orifice area defined by orifice 52 at the beginning of the stroke, in the case where a completely rigid body is being cushioned from impact.

While in most cases this assumption will result in a reasonably efficient design, small alterations can be readily made to this shape to give a closer approach to the optimum constant force travel characteristic for a given situation after a few experimental trials. However, the shape given by the above formula is the best starting point. Furthermore, it is usually possible to obtain a reasonably efficient design by approximating the tapered shape given by the above expression as by calculating a series of spaced cross-sectional areas of the pin 24 and connecting the cross-sectional areas so determined by straight tapers, if this facilitates manufacture. The orifice areas referred to, are the orifice areas of orifice 52 minus the cross-sectional area of the metering pin at any given position along the stroke of the metering pin.

The metering pin 24 between point 102 and the closure member or plate 22 is thus left with a cylindrical surface portion 110 having a diameter that is substantially the same as the diameter of the piston head orifice 52. The arrangement is therefore such that the tapering surfaces 55 end in cylindrical surface portion 110 before the piston head 14 contacts closure plate or member 22. Since the surface portion 110 substantially closes the piston head orifice 52, some hydraulic liquid will tend to be trapped between the piston head and closure plate 22, except for leakage flow between the piston head and cylinder wall. In the specific embodiment of the invention illustrated, the piston head is based on the order of ½ inch from the closure plate or member 22 when orifice 52 is closed by surface portion 110, give stroke $d$ a length of 29½ inches, as it is desired that device 10 have a nominal stroke of 30 inches.

My invention contemplates the use of any suitable liquid medium that will not corrode or otherwise attack the various components of the unit, and will be in liquid form at ordinary temperatures and have a viscosity that does not fall outside the range of 45 Saybolt universal seconds at +130 degrees F. and 2000 Saybolt universal seconds at −30 degrees F. However, I prefer to use the high viscosity index oil sold by The Shell Oil Company under the trade designation "Aeroshell" No. 4 as this oil desirably has a relatively small variation in viscosity between the extremes of minus 60 degrees F. and 150 degrees F., maintaining a fluid condition at the low temperature instead of becoming too viscous to flow.

The tubular cylinder 12 and piston rod 16 are preferably proportioned in relative lengths to permit the piston head to move the full length of cylindrical surface 110, should this movement be necessary.

The closure plate or member 22 may be formed from A.I.S.I. 1015–1018 open hearth (or mild) steel plate which has compositional characteristics compatible with the cold drawn steel used in the cylinder, simplifying the choice of weld material for insuring a sound weld.

Piston head 14, which may be formed from relatively soft annealed A.I.S.I. 4140 chrome-molybdenum steel, in the illustrated embodiment comprises a disc-like body 120 (see FIGURE 4) which is heat treated for hardness after the necessary machining has been done, formed with planar forward face 122 and planar rearward face 124. The planar face 122 merges into conical feed surface 126 that terminates in rim 128 which defines the perimeter of the piston head orifice 52. The piston head 14 is formed with recess 130 to receive the extreme end of the tubular piston rods 16, the two being welded together as at 132. The rim or surface 128 of piston head 14 in practice assumes the form of a cylindrical surface having a length on the order of ¼ to ½ of an inch (lengthwise of the metering pin 24).

The rim or surface 128 of piston head 14 should have a diameter giving a tolerance spacing or clearance between the piston head and the cylindrical surface 69 of metering pin 24 that is about the same as that between the piston head and the internal surface 27 of cylinder 12 so that the metering pin will not be stressed by lateral movements of the piston head during operation. In a specific embodiment of this invention, the tolerance is on the order of .017 inch.

The piston head 14 may be formed with an annular recess 136 to receive a conventional type piston ring 138, which may be eliminated where close tolerances are employed.

Tubular piston rod 16, which may be formed by being cold drawn from A.I.S.I. 4130 chrome-molybdenum steel and, after all machining is completed and the piston head welded thereto, heat treated to the desired yield strength (preferably as a unit with head 14 and plug 142), in the illustrated embodiment is in the form of tube 139 having ports 62 formed therein in any suitable manner. The ports 62 are four in number in the illustrated embodiment, and are in the form of elongated holes of substantial size. The elongated form of ports 62 provides a maximum discharge port area, with corresponding reduction in back pressure effects, while keeping the piston rod of sufficient cross section at ports 62 to resist the compressive forces developed in the piston rod.

The closure 23 may be formed from open hearth mild steel plate such as A.I.S.I. 1015–1018, and affixed to tube 139 in the manner suggested by FIGURE 3. As indicated, plug 142 (which preferably is formed from the same material as piston rod 16) may be welded within tube 139 and closure 23 fixed to plug 142 by an appropriate bolt 149.

It is important that a complete hermetic or hydraulic seal be effected at the welds between the cylinder 12 and closure member 22, between closure member 22 and metering pin 24, and between plug 142 and piston rod 14. For the materials specified above, an E–16 low hydrogen high strength electrode or its equivalent should be used for fixing the closure member 22 to cylinder 12 and plug 142 to piston rod 16; the pin 24 may be welded to head 22 by employing any electrode customarily used on open hearth mild steel, such as an E–12. These welding materials for the specific device herein described provide a homogeneous union with a complete seal type weld.

The tubular piston rod guide member 38, which may be formed from open hearth mild steel, comprises a hub-like element 150 including a flange portion 152 that is received in counterbore 30 of cylinder 12, and annular shoulder 154 to which the end 40 of the tubular seal 18 is secured. As indicated in FIGURE 4, the apertures 66 of guide member 38 are relatively large and are more or less equally distributed about this member. The hub-like member 150 may be formed with an appropriate recess 160 to receive a conventional O-ring seal 162.

The annular abutment ring 36 may be formed from any suitable material and is welded to the external surface 44 of the tubular piston rod as at 165. The piston rod guide member 38 and ring 36 are preferably provided with complementary surfaces 167 and 169, respectively, which engage when the device is returned to its extended position of FIGURE 1.

The tubular seal or boot 18 may be formed from any conventional substance that will resist the hydraulic liquid employed in unit 10 and retain the pleating employed. The substance employed should be an elastomer that is not only resistant to the liquid employed, but also has good tear resistance in any direction, low temperature flexibility and resistance to attack by industrial atmospheres. One suitable material is the product of B. F. Goodrich Chemical Co. sold under the trademark Hycar, which is a copolymer of butadiene and acrylonitrile.

Since the inwardly directed edges 191 of the seal or boot may otherwise be pressed into engagement with the outer surface of the piston rod as device 10 approaches its contracted position, I prefer that bracing wear resisting rings 193 be applied to the seal, at the edges 191, about the inner surface 195 thereof. These rings 193 may be formed from brass and embedded in the seal 18 when it is formed.

Figures 5, 6, 7, 8:
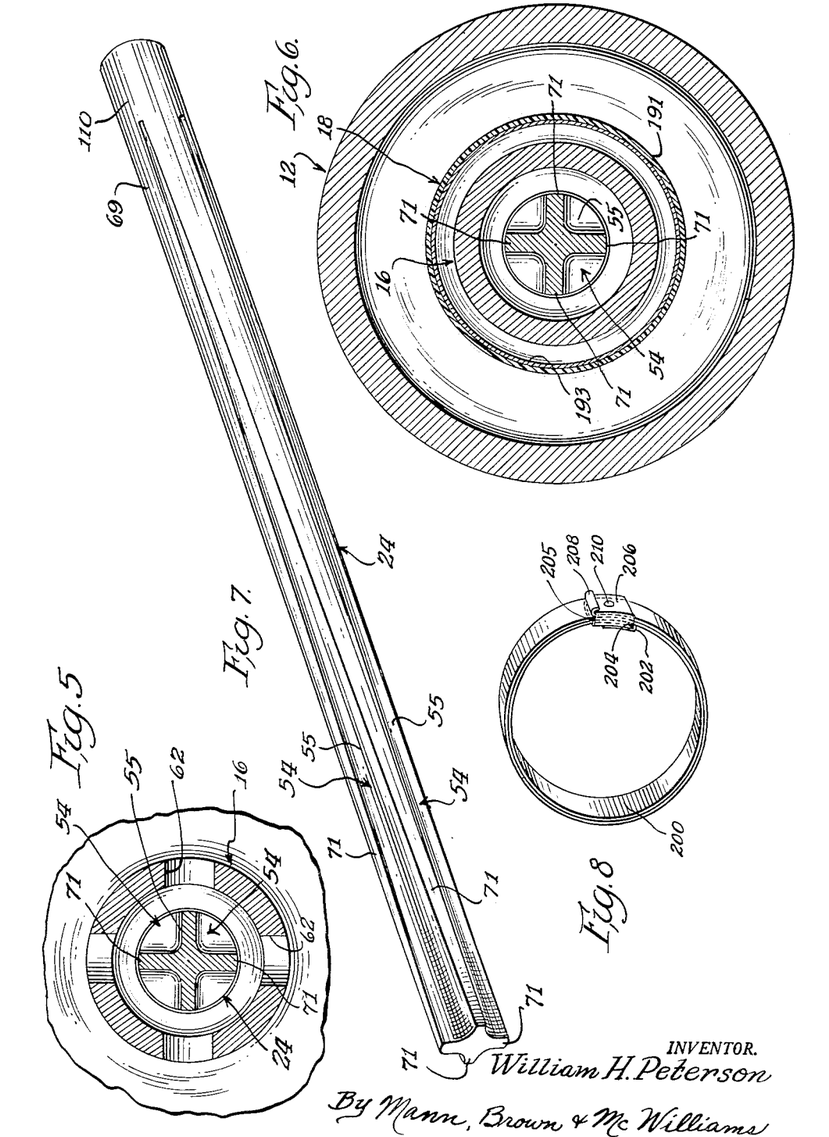
FIGURE 5 is a fragmental cross-sectional view along line 5—5 of FIGURE 4.
FIGURE 6 is a cross-sectional view along line 6—6 of FIGURE 4.
FIGURE 7 is a perspective view of the improved metering pin employed in the device of this application.
FIGURE 8 is a perspective view diagrammatically illustrating a hose clamp of the type suitable for use in my invention.

The clamps 42 and 46 may be of any suitable type, though the form of clamps sold under the trademark "Punch-Lok" is preferred as it lies substantially flush against the surface of the seal or boot 18 and insures a hermetic sealing action between the boot and the structures it is clamped against. These clamps are available from the Punch-Lok Company of Chicago, Illinois, and as shown in FIGURE 8, comprise a stiff metallic strip 200 having one of its ends hooked as at 202 to engage one edge 204 of looped band member 206, the strip being wound on itself several times through said band member. In this condition, it is applied to one end of seal or boot 18, after which the free end of the strip 200 is pulled to tighten the band around boot and then is bent over the other edge 205 of the band member 206 and is trimmed off, as indicated at 208. The band member 206 and the passes of strip 200 passing through it are temporarily locked together as by forming indentation 210, after the strip has been pulled tight about boot 18, and before the free end of the strip is trimmed off.

The compression springs 20 may be formed from A.I.S.I. C-1095 spring steel, heat treated, or any other suitable substance that will serve the purpose, and may be in the form of a single unit or two compression springs acting in tandem, though in the latter case the spring extending over tubular piston rod 16 should be of sufficient length to engage over the end of tubular cylinder 12 when the device 10 is in its extended position.

The unit 10 should be designed for the maximum impact and energy absorption requirements of any cushioning system in which the device is to be incorporated will be subjected to. Thus, the unit should be designed so that when the metering pin surface portion 110 closes piston orifice 52, the device will have absorbed the maximum impact that can be applied to the cushioning system.

In a specific embodiment of the invention, the illustrated components are proportioned to provide an extended length of 91½ inches (at which position abutment ring 36 bears against piston rod guide member 38) and a compressed or maximum retracted length of 61½ inches (at which position the piston head 14 is spaced ½ inch from closure plate or member 22 and orifice 52 is closed by metering pin surface 110). This specific unit has a maximum outside diameter of 12⅝ inches as measured by the flanges 170 of the closure members 22 and 23 and the cylinder 12 has an 8½ inch diameter bore. In the illustrated embodiments, the springs 20 comprise two spring units acting in tandem against the flanges 170 of said closure members and abutting against annular seat 171 at the midpoint of the unit; each spring 20 is coiled from a spring steel bar approximately 50 feet in length. The maximum outside diameter of this specific embodiment is dimensioned to fit inside of a standard freight car Z-26 section center sill member forming a draft and buffing column of a cushion underframe railroad car of the type disclosed in Meyer Patent 2,764,299.

After the unit 10 has been assembled except for application of the check valve assembly 74, the unit may be charged by standing it upright so that closure member or plate 22 is uppermost and then, filling the device with hydraulic liquid through the threaded opening 79. The assembled check valve assembly 74 is then turned into place and further hydraulic liquid is applied to the unit through the check valve to sufficiently compact the seal 18 to space it from cylinder 12. After working the cylinder 12 up and down a few times, any entrapped air will rise to the check valves 74 where it may be bled out. Then an additional charge of hydraulic liquid is introduced through the check valve to make up for the air volume that has been bled from the unit, and to sufficiently compact the seal so that it will not rub or be rubbed by the internal surface of the cylinder 12.

The hydraulic liquid when the device is in fully extended position is under very little pressure, perhaps no more than 2 p.s.i., but even though the pressures in the high compression cylinder may rise to as much as 8,000 p.s.i., as when the device 10 is employed in railroad cars to cushion buff and draft forces, the maximum pressure acting on the seal or boot 18 (when the seal is in the extended position of FIGURE 2) is believed to be about 6 p.s.i.

Units 10 can be designed for operating pressures of up to the limit of the yield strength of cylinder 12, and the device illustrated when employed in a cushion underframe is capable of absorbing kinetic energy on the order of one million foot pounds, depending, of course, on the specific design required for a specific purpose. Units 10 will thus easily absorb 15 m.p.h. impacts when applied to, for instance, a railroad cushion underframe of the type shown in Meyer et al. Patent 2,764,299.

*Advantages of Invention*

It will therefore be seen that I have provided a simplified and highly efficient hydraulic cushion device that is especially adapted for long travel cushioning applications.

It will be noted that the seals provided by the clamps 42 and 46 and by the seals at the closure members 22 and 23 are of the static type. Thus, the need for accurately machined surfaces is eliminated. The sealing action between piston head 14 and the internal surface of the tubular cylinder 12 need only be sufficient to insure the cushioning action required since a small amount of leakage has no significant adverse effects. Furthermore, the seal provided by clamps 42 and 46 and the tubular member they clamp in place is located at portions of the device that are not exposed to high pressures, while the seals exposed to high pressures are made by the rigid weld material, such as that at 72, 90 and 92, of FIGURE 3. Since the welding material at these points, when properly done, is impervious to liquid, the effectiveness of such seals is obvious.

An important aspect of my invention is that the sealing action about the piston head 14 is effected principally by the viscosity of the hydraulic liquid employed. For instance, in a further specific but somewhat smaller embodiment of the invention, an average clearance of about .005 inch exists between the piston and a cylinder 12 having a 5½ inch diameter bore, which gives a leakage area of about .086 square inch about the piston head (the piston ring being omitted in this embodiment). The initial orifice area defined by orifice 52 for this embodiment being on the order of .649 square inch, the leakage area is thus about 13 percent of this, and as the stroke continues, this percentage increases due to the decreasing orifice area. However, the viscosity of the hydraulic liquid effects a sufficient sealing action around the piston head to be adequate for purposes of my invention. If leakage about the piston head becomes excessive, this may be remedied by making the piston of greater dimension longitudinally of the cylinder 12, so as to increase the length of the flow path and resistance to leakage. When hydraulic liquid of the type above specified is to be employed, a piston head thickness of about 1½ inches is satisfactory for the specific embodiments referred to, but the actual piston thickness for any specific design will depend on such factors as the viscosity of the hydraulic liquid employed, the tolerances to be followed, and the pressure range that the device is to operate in.

In the illustrated device, which has an 8½ bore in cylinder 12, piston ring 138 is employed to insure that the leakage area has about the same relation to the orifice area, as in the small embodiment mentioned above. This has been found necessary as the larger size tubing has greater variations in internal diameter necessitating the correction provided by the piston ring.

While it is important that the viscosity of the hydraulic liquid employed remain substantially constant over a reasonable temperature range, the effect of viscosity changes in device 10 is minimized by the relatively short passage defined by rim 128 that forms orifice 52. The reason for this is that the effect of viscosity variations is a direct function of the length of the passage through which the hydraulic liquid flows.

Successful tests made on a cushion unit having the piston head fits described immediately above involved the use of a tube for cylinder 12 just as it was purchased from the manufacturer, with no machining of the inside surface 27, except for the formation of counterbore 30 and groove 34. The cost savings obtained by avoiding the necessity for precision more than compensate for any small reductions in potential efficiency.

The oil leakage past piston head 14 because of tolerance variations actually serves an important function in my invention. As shown in FIGURE 3, the orifice 52 should close rapidly near the end of the contraction stroke, since if the constant force travel characteristic is to be maintained to as near the stroke end as possible, the reduction in oil flow must correspond to the drop in the velocity of the piston head 14 as it approaches zero. If the piston head continues to move on closure of orifice 52, the oil flow around piston head 14 prevents a sudden peaking of the cushioning force at the stroke end. The clearance tolerance which is provided between pin surface 69 and the piston head surface 128 also permits some oil flow at the stroke end, which contributes to the elimination of the force peaks at the end of the stroke.

Since the unit 10 is designed so that the maximum impact to be absorbed will have been absorbed when the orifice 52 closes, the piston head will be spaced from closure 22 when the device is in its fully retracted position. This prevents the piston head from bottoming against closure plate 22 and the leakage about the piston head still permits the device to close further if need be, as limited by the length of metering pin surface portion 110. The length of the surface portion 110 in the above mentioned specific embodiments is ½ inch, which was settled on after experimentation indicated the need for a spacing, in that range, of the piston head from closure 22 in the fully retracted position.

As the hydraulic liquid flows into chamber 64 on contraction of the device, and the tubular seal 18 extends under the relative movement of the piston rod and guide member therefor, the pleated wall of the seal is deflected inwardly toward the external surface 39 of the piston rod which increases the tension that is applied to the seal. This additional tensioning of the seal, in addition to the outside atmospheric pressure on the seal, insures the return of the hydraulic liquid through the piston head to the high pressure side of the piston on return of the unit to its extended position. This deflectability of the seal avoids any large build up of back pressure that would interfere with the operating characteristics of the device, and also compensates for temperature expansion and contraction of the volume of hydraulic liquid.

The external and internal surfaces of the tubular piston rod need only be a standard rough finish (the finish normally obtained in commercial cold drawn tubing) since the guiding action provided by the guide member 38 does not require a highly polished surface and the metering pin does contact the tubular piston rod. The internal surface of the cylinder may be of like character since the viscosity of the hydraulic liquid is being relied on to effect the sealing action necessary between the cylinder 12 and piston head 14.

The cooperation of the piston head rim 128 (that defines orifice 52) and the ridges 71 defined by the metering pin 24 prevents vibration and chattering of the metering pin, and this not only protects the orifice 52 from deformation, but also protects the metering pin itself from fatigue. The clearance tolerance between the pin 24 and piston head surface 128 normally spaces the pin from the piston head, but at the incipience of vibration contact is made to effect the necessary guiding action on the metering pin.

On contraction of the unit in absorbing shock, the high pressure hydraulic flow is confined within the chamber 64 adjacent piston head 14 and the hydraulic liquid flow in the area of seal 18 is of relatively low velocity because the kinetic energy of the hydraulic liquid has been substantially dissipated in the liquid flow against the inner surface 27 of cylinder 12. Furthermore, the hydraulic liquid flow in the area of seal 18 is longitudinally of the seal, which avoids to a large extent the impinging of rapid hydraulic flow against the material forming the seal, thereby avoiding excessive wear or deterioration on this member.

The action of the hydraulic liquid in flowing through orifice 52 and into turbulence chamber 64 dissipates in the form of heat substantially all of the kinetic energy imposed upon the device 10 that is not transferred by it, with the exception of the small amount of potential energy stored in springs 20. As the device contracts under the shock, the discharge of hydraulic liquid from orifices 62 engages successively different portions of the cylinder 12, thus accentuating the heat dissipation effect provided.

The improved device of this application results in the seal 18 being disposed entirely within the cylinder 12 which thus fully protects it from perforation or exposure to the elements. The piston rod guide 38, in addition to its cooperation with the piston rod, seals in member 18 within the cylinder 12.

As already mentioned, the positioning of abutment ring 36 effects the relative spacing of the piston rod guide member and the piston head 14 which overcomes any tendency to jackknife on imposition of impacts against the device. The reason for this is that when the piston rod guide 38 and the piston head 14 are spaced as suggested, two relatively widely spaced contacts between the cylinder 12 and the piston or piston rod will be obtained, which insures adequate bracing against jackknifing.

The total port area defined by ports 62 should be substantially greater than the orifice area defined by orifice 52 and the metering pin 24. I have found that in practice that ports 62 should define an area that is four times the initial effective orifice area provided by orifice 52; while this does not appear to be too critical, it is desirable that there be an excess discharge area from the tubular piston rod to prevent ports 62 from significantly influencing the constant force characteristic provided by metering pin 24 in operation with orifice 52.

As has already been noted, the discharge from ports 62 is laterally of the piston rod, which is highly effective in creating a turbulene that will effectively convert the kinetic energy of the hydraulic liquid into heat. This is done while permitting a low velocity hydraulic liquid flow along the length of the invaginating boot 18.

The unit 10 does not require check valves other than valve assembly 74 and need not necessarily be round in cross-sectional configuration, though from a manufacturing stand-point, this shape is preferred over polygonal cross sections. Unit 10 is in effect hermetically sealed against the entry of air or loss of hydraulic liquid.

The unit 10 may be employed wherever a long travel kinetic energy dissipating cushioning action is desired; in addition to use in connection with a railroad car cushion underframe, the device may be employed to cushion fifth wheel stands, as a dock buffer for the berthing of ships, as a safety buffer at the bottom of an elevator shaft, as a back-stop at the end of an inclined conveyor track, and as a gun recoil absorber, to mention just a few.

While the unit 10 was designed to provide a cushioned traveling action on the order of thirty inches, the principles of the invention are just as applicable to short travel units. And it will be apparent that the metering pin arrangement of this application may be used interchangeably with the metering pin arrangement of my application Serial No. 782,786; this also applies to the tubular seal arrangements illustrated in said application Serial No. 782,786 and in this application.

Again, it is stressed that the simplified seals I have provided between the tubular cylinder 12 and the piston head and its piston rod 16 eliminate the need for precision formed parts. The cylinder 12, the piston head, and the tubular piston rod may be relatively loose fitting and yet provide all of the necessary cushioning action required. This eliminates the costly machining operations customarily required for devices of this type. Furthermore, the effective sealing action provided by the clamps 42 and 46 as well as the seal at the closure member 22 prevents any leakage, which eliminates the need for frequent inspections and servicing. Consequently, it will be seen that my invention provides an efficient hermetically sealed cushion device of low initial cost and minimum maintenance requirements.

The term "mandrel-formed surface" as employed in the appended claims means surfaces on the order specified for surface 27 of tubular cylinder 12 and surfaces 29 and 39 of piston rod 16, which is to be distinguished from machined surfaces providing close tolerances.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A hydraulic cushioning device comprising a cylinder, a piston member reciprocably mounted in said cylinder for movement toward and away from one end of said cylinder, a closure structure sealing off said one end of said cylinder, a piston rod member carried by said piston member and extending toward the other end of said cylinder, a piston rod member guide interposed between said piston rod member and said cylinder adjacent said other end of said cylinder, and a tubular extensible seal received in concentric relation about said piston rod member and having one of its ends secured wtih respect to and adjacent said other end of said cylinder, and having its other end secured to said piston rod member adjacent said piston member, said piston member being formed with orifice means communicating through said piston member, means for biasing said piston member away from said one end of said cylinder, stop means interposed between one of said members and said cylinder against which said one member is biased by said biasing means, said cylinder being adapted to be charged with hydraulic liquid, and said piston rod guide being formed to place the space between said seal and said piston rod in free communication with the ambient air.

2. A hydraulic cushion device comprising a cylinder, a piston member reciprocably mounted in said cylinder for movement toward and away from one end of said cylinder, a closure structure sealing off said one end of said cylinder, a tubular piston rod member carried by said piston member and extending toward the other end of said cylinder, a piston rod member guide interposed between said piston rod member and said cylinder adjacent said other end of said cylinder, a tubular accordion type seal received in concentric relation about said piston rod member and having one of its ends secured with respect to and adjacent said other end of said cylinder, and having its other end secured to said piston rod member adjacent said piston member, said piston member being formed with an orifice opening in alignment with the bore of said tubular piston rod member, a metering pin structure fixed with respect to said cylinder and in alignment with said piston member orifice opening and said piston rod member bore, means for biasing said piston member away from said one end of said cylinder, and stop means interposed between one of said members and said cylinder against which said one member is biased by said biasing means in the extended position of the device, said cylinder and said piston rod member being charged with hydraulic liquid.

3. A hydraulic cushion device comprising a cylinder, a piston member reciporcably mounted in said cylinder for movement toward and away from one end of said cylinder, a closure structure sealing off said one end of said cylinder, a tubular piston rod member carried by said piston member and extending toward the other end of said cylinder, a piston rod member guide interposed between said piston rod member and said cylinder adjacent said other end of said cylinder, a tubular accordion type seal received in concentric relation about said piston rod member and having one of its ends secured with respect to and adjacent said other end of said cylinder, and having its other end secured to said piston rod member adjacent said piston member, said piston rod guide being formed with spaced passages to place the space between said seal and said piston rod in free communication with the ambient air, said piston member being formed with an orifice opening in alignment with the bore of said tubular piston rod member, a metering pin structure fixed to said closure structure and in alignment with said piston member orifice opening and said piston rod member bore, said metering pin structure extending through said piston member orifice opening and including spaced side walls in sliding engagement with the portion of said piston member defining said orifice opening, said metering pin side walls defining at least one tapering groove forming with said piston member an orifice opening for the passage of hydraulic liquid from one face of said piston member to the other face thereof, port means formed in said tubular piston rod member between said piston member and said other end of said seal, means for biasing said piston member away from said one end of said cylinder, and stop means interposed between one of said members and said cylinder against which said one member is biased by said biasing means in the extended position of the device, said cylinder and said tubular piston rod member being adapted to be charged with hydraulic liquid.

4. A hydraulic cushion device adapted for application to railroad car cushion pockets, said device comprising a cylinder having one end thereof sealed by a closure structure that serves as a follower of the device, a piston member reciprocably received in said cylinder, a tubular piston rod member fixed at one end thereof to said piston member and extending outwardly of the other end of said cylinder, a follower structure secured to the other end of said piston rod member, a tubular accordion type seal concentrically received over said piston rod member and having one of its ends fixed in sealing relation to said piston rod member adjacent said piston member, a piston rod member guide interposed between said piston rod member and said other end of said cylinder, with the other end of said seal secured in sealing relation to said guide, said guide being formed with passages communicating between the space between said seal and said piston rod and the ambient air, means for metering the flow of hydraulic liquid between opposite sides of said piston member, said means comprising a metering pin structure fixed to said cylinder and extending longitudinally thereof, and an orifice opening formed in said piston member in alignment with the bore of said piston rod member, said metering pin structure being aligned with said orifice longitudinally of said device, means for biasing said piston member away from said one end of said cylinder, orifice means formed in said piston rod member between said piston rod member and said one end of said seal, and stop means interposed between one of said members and said cylinder against which said one member is biased by said biasing means in the extended position of the device, said stop means being positioned to space said piston rod member orifices inwardly of said guide in the extended position of the device.

5. A hydraulic cushioning device adapted for application to railroad cars comprising a tubular cylinder member, a closure head member affixed to one end of said cylinder member, means for effecting a static hermetic seal between said closure member and said one end of said cylinder member, piston head means reciprocably mounted in said cylinder member for movement toward and away from said one end of said cylinder member, a tubular piston rod affixed to said piston head means, said piston rod extending away from said one end of said cylinder member and projecting outwardly of the other end of said cylinder member, said piston rod being of less transverse dimension than said piston head means, a closure member affixed to the end of said piston rod that is remote from said piston head means, means for effecting a static hermetic seal between the last mentioned closure member and said end of said piston rod, with the internal surface of said cylinder member having a smoothness substantially equivalent to that of a mandrel formed surface, a metering pin carried by the first mentioned closure member, said piston head means being formed with an orifice to receive said metering pin, said orifice and said metering pin being aligned with the bore of said piston rod, said metering pin being proportioned transversely thereof along its effective length to slidingly engage the portion of said piston head means defining said piston head means orifice, said metering pin being formed to define hydraulic liquid flow restricting means extending through said piston head means orifice for providing said device with a substantially constant force travel closure characteristic, a tubular cylinder head member secured to said cylinder member with said piston rod extending therethrough, said piston head means being disposed between said head members, said tubular head member including an annular flange portion, means for effecting a static hermetic seal between said cylinder member and said tubular head member, means for effecting a static hermetic seal between said tubular head member and said piston rod, the last mentioned means including a resiliently deflectable flexible hydraulic liquid impervious tubular member received over said piston rod and having one of its ends sealingly clamped to said tubular head member flange portion, and the other end thereof sealingly clamped to said piston rod, said piston rod being formed with spaced orifices directed transversely of said piston rod for connecting said piston rod bore with the space between said piston head means and said tubular head member, with the space enclosed by said cylinder member, said closure members, said piston rod and said static seals being fully charged with hydraulic liquid, with the tolerance between said internal surface of said cylinder member and said piston head means being proportioned to effect the sealing action therebetween at least in a substantial way by the viscosity of said hydraulic liquid, resilient means for biasing said piston head means away from said one end of said cylinder member, and stop means associated with said cylinder member and piston rod for limiting the amount of relative movement of said cylinder member with respect to said piston head means and piston rod under the action of said resilient means, said stop means being positioned with respect to said cylinder member and said piston rod such that said piston rod orifices are disposed between said piston head means and said tubular head member in the extended position of said device.

6. The device set forth in claim 2 wherein said stop means is positioned to space said piston member and said guide from each other, in the extended position of the device, a distance on the order of one quarter of the length of the device.

References Cited in the file of this patent

UNITED STATES PATENTS

| | | |
|---|---|---|
| 2,231,332 | Griepenstroh | Feb. 11, 1941 |
| 2,469,912 | Bachman | May 10, 1949 |
| 2,506,725 | Magrum | May 9, 1950 |
| 2,621,924 | Panhard | Dec. 16, 1952 |
| 2,643,112 | Smith | June 23, 1953 |
| 2,948,413 | Zanow | Aug. 9, 1960 |

FOREIGN PATENTS

| | | |
|---|---|---|
| 1,153,671 | France | Oct. 14, 1957 |
| 773,102 | Great Britain | Apr. 24, 1957 |

UNITED STATES PATENT OFFICE
CERTIFICATE OF CORRECTION

Patent No. 3,035,714                May 22, 1962

William H. Peterson

It is hereby certified that error appears in the above numbered patent requiring correction and that the said Letters Patent should read as corrected below.

Column 12, line 37, for "reciporcably" read -- reciprocably --; column 13, line 25, strike out "rod", second occurrence.

Signed and sealed this 4th day of September 1962.

(SEAL)
Attest:

ERNEST W. SWIDER
Attesting Officer

DAVID L. LADD
Commissioner of Patents